United States Patent
Smolik

(10) Patent No.: US 7,699,333 B2
(45) Date of Patent: Apr. 20, 2010

(54) SADDLE TUBE FOR A BICYCLE FRAME

(75) Inventor: Hans-Christian Smolik, Freinberg-Marklkofen (DE)

(73) Assignee: Canyon Bicycles GmbH, Koblenz (DE)

( * ) Notice: Subject to any disclaimer, the term of this patent is extended or adjusted under 35 U.S.C. 154(b) by 425 days.

(21) Appl. No.: 11/578,748

(22) PCT Filed: Apr. 15, 2005

(86) PCT No.: PCT/EP2005/051675

§ 371 (c)(1),
(2), (4) Date: Oct. 18, 2006

(87) PCT Pub. No.: WO2005/100141

PCT Pub. Date: Oct. 27, 2005

(65) Prior Publication Data

US 2007/0205575 A1    Sep. 6, 2007

(30) Foreign Application Priority Data

Apr. 19, 2005   (DE) .................. 10 2004 019 381

(51) Int. Cl.
    B62K 3/14    (2006.01)
(52) U.S. Cl. .................. 280/281.1; 280/274; 280/278; 280/288.3
(58) Field of Classification Search ............. 280/281.1, 280/274, 278, 288.3, 281
    See application file for complete search history.

(56) References Cited

U.S. PATENT DOCUMENTS

| 4,746,136 | A | * | 5/1988 | Kirk ................. 280/281.1 |
| 4,921,267 | A | * | 5/1990 | Kirk ................. 280/281.1 |
| 5,016,895 | A | | 5/1991 | Hollingsworth et al. |
| 5,255,932 | A | | 10/1993 | Moore |
| 5,803,476 | A | * | 9/1998 | Olson et al. ........... 280/281.1 |
| 6,123,353 | A | * | 9/2000 | Bennett et al. ......... 280/281.1 |
| 6,139,038 | A | | 10/2000 | Santa Cruz et al. |

FOREIGN PATENT DOCUMENTS

| CH | 266540 | 1/1950 |
| CH | 266540 A | 1/1950 |
| DE | 105016 C | 1/1899 |
| DE | 743544 C | 12/1943 |
| DE | 9313395 U1 | 12/1993 |
| DE | 4315084 B4 | 11/1994 |
| DE | 9321324 U | 4/1997 |
| DE | 9321324 U1 | 4/1997 |
| DE | 19712326 A1 | 10/1998 |
| DE | 10128796 A1 | 12/2002 |
| DE | 112006000861 T5 | 3/2008 |
| FR | 895046 A | 1/1945 |

(Continued)

*Primary Examiner*—Lesley Morris
*Assistant Examiner*—Marlon A Arce
(74) *Attorney, Agent, or Firm*—Clements Bernard PLLC; Gregory N. Clements

(57) ABSTRACT

In a saddle tube for a bicycle frame, especially a racing bicycle frame, the bottom bracket end (22) of the saddle tube is wider in a direction transverse to the longitudinal direction (24) of the frame than in the longitudinal direction (24) of the frame. According to the invention, the saddle tube (18) has a flat portion (32) at the chain ring side.

14 Claims, 2 Drawing Sheets

FOREIGN PATENT DOCUMENTS

| | | |
|---|---|---|
| FR | 2477495 A | 9/1981 |
| FR | 2477495 A1 | 9/1981 |
| GB | 608223 A | 9/1948 |
| GB | 608223 A | 9/1948 |
| GB | 2247869 A | 3/1992 |
| GB | 2247869 A | 3/1992 |
| JP | 11001191 A | 1/1999 |

* cited by examiner

SADDLE TUBE FOR A BICYCLE FRAME

BACKGROUND OF THE INVENTION

The invention relates to a saddle tube for a bicycle frame, in particular for a racing bicycle frame. The invention further relates to a bicycle frame, in particular for a racing bicycle frame, with a saddle tube.

A conventional bicycle frame comprises a top tube and a down tube interconnected through a fork receiving element. Further, the bicycle frame comprises a saddle tube that is arranged in the rear part of the bicycle frame and connected with the top tube and the down tube. The connection between the saddle tube and the down tube may be effected via a bottom bracket receiving element. A saddle post carrying the saddle is slipped into the saddle tube from above. Especially with racing bicycles, high bending loads occur in the saddle tube.

From CH 26 65 40 it is known to configure a saddle tube such that the cross section tapers towards the bottom bracket. Moreover, the saddle tube is of transverse oval shape so that at the bottom bracket end of the saddle tube the width of the saddle tube is larger in a direction transverse to the longitudinal direction of the frame than in the longitudinal direction of the frame. Thereby, the forces and moments occurring are supposed to be absorbed or transmitted better. Since the maximum width of the saddle tube at the bottom bracket end thereof is limited especially because of the chain ring and of the required pivoting space for the derailer, the saddle tube described in CH 26 65 40 has reduced dimensions only in the longitudinal direction of the frame, yet is not larger in a direction transverse to the longitudinal direction of the frame than conventional bicycles. Regarding the occurring bending loads especially at the bottom bracket end of the saddle tube, the transverse oval design illustrated in CH 26 65 40 does not create any improvement in this respect.

Studies have shown that the bending loads are the highest at the bottom bracket end of the saddle tube, i.e. at the end of the saddle tube facing the bottom bracket, which is usually connected with the bottom bracket receiving element. The bending loads decrease steadily to the top, i.e. towards the saddle post end or towards the top tube. The bending loads occurring in the saddle tube are transferred into the bottom bracket receiving element, whereby the stiffness of the bottom bracket is influenced. Therefore, the saddle tube should have a diameter as large as possible. However, the diameter is limited at its bottom bracket end since sufficient space has to be provided for pivoting the chain derailer. In the central part of the saddle tube, the diameter is limited as well, since otherwise, the rear wheel would drag at the saddle tube. Increasing the saddle tube diameter in this portion would thus require an extension of the rear section, which might have negative effects on the driving behavior of the bicycle. Thus, known saddle tubes have a maximum outer diameter of 35 mm.

It is an object of the invention to provide a saddle tube, which can improve the stiffness of the bottom bracket.

According to the invention, the object is achieved with the features of claim 1.

At its bottom bracket end, the saddle tube of the invention is wider in a direction transverse to the longitudinal direction of the frame or to the traveling direction than in the longitudinal direction. Preferably, the saddle tube is at least partly designed in a transverse oval shape at its bottom bracket end. By widening the saddle tube transverse to the longitudinal direction of the frame, the flexural rigidity of the saddle tube can be improved. This also causes an improvement in the stiffness of the bottom bracket. Since, according to the invention, the saddle tube has been widened only transverse to the longitudinal direction of the frame and preferably has a common width in the longitudinal direction of the frame, the rear wheel will not drag at the saddle tube even without a rearrangement of the rear structure.

In order to retain the position of the chain rings and the position of the chain derailer, the saddle tube has a flat portion on the chain ring side, i.e. on the side facing the chain ring when mounted. A saddle tube which, without a flat portion, would have a width of 45-55 mm, preferably 48-52 mm, transverse to the longitudinal direction of the frame, is flattened to a width of 35-40 mm, preferably 36.5-38.5 mm.

The width of the saddle tube in the longitudinal direction of the frame preferably is 30-40 mm, and particularly preferred 32.5-37.5 mm.

Since the present configuration of the saddle tube is chosen such that the width of the saddle tube in the traveling direction or in the longitudinal direction of the frame is maintained and is not reduced and, in addition, the saddle tube is widened transverse to the longitudinal direction of the frame, considerably larger forces and moments can be absorbed by the saddle tube especially in the area of the bottom bracket. Here, due to the present configuration, especially the flattening of the saddle tube on the chain side, it is guaranteed that the usual frame geometries, such as the design of the rear structure, can be maintained. This is of great importance for the driving behavior. Owing to the present flat portion at the bottom bracket end of the saddle tube, no changes have to be applied to the structure of the chain rings and the derailers and, especially of the shifting system. Thus, the present configuration of the saddle tube allows to obtain a better absorption of forces and moments, as well as an increase in the bottom bracket stiffness without entailing consequential costs or negative effects caused by a necessary restructuring of other components.

Preferably, the saddle post end, i.e. the end of the saddle tube into which the saddle post is slipped, is of circular cylindrical shape. Here, the diameter of the saddle tube is preferably constant over a portion at the saddle post end. Preferably, this portion has a length of at least 8 cm, preferably at least 10 cm, and particularly preferred at least 12 cm. The outer diameter of the saddle tube in the portion at the saddle post end preferably is 32-38 mm. The inner diameter is adapted to the outer diameter of the saddle post, with the saddle posts being used preferably having large diameters, the presently most common saddle post with the largest diameter having an outer diameter of about 31.6 mm. Due to the round shape of the saddle tube in this portion, a simple and low-cost clamping of the saddle post is possible.

In a portion at the bottom bracket end, the saddle tube preferably also has a constant cross section in the longitudinal direction. Preferably, the cross section is constant for a length of more than 8 cm, particularly preferred more than 12 cm, and most preferred more than 15 cm. The transition between the portion at the bottom bracket end and the portion at the saddle post end of the saddle tube may be continuous. Preferably, the transition portion is substantially conical. The flat portion provided at the bottom bracket portion of the saddle tube preferably extends into the transition portion. Preferably, the flat portion extends to the boundary between the transition portion and the saddle post portion of the saddle tube. Here, it is most preferred to have the flat portion configured such that a smooth transition between the transition portion and the saddle post portion is realized.

Irrespective of the above-described preferred dimensions of the saddle tube, the width of the present saddle tube decreases from the bottom bracket towards the saddle post end. Here, the outer dimension may decrease continuously or in single steps, so that the outer dimensions transverse to the traveling direction are constant in the bottom bracket portion, decrease continuously in the transition portion and are constant again in the saddle post portion. Preferably, the outer dimensions of the saddle post tube never increase starting from the bottom bracket. If the outer dimensions in the individual portions are constant, the invention provides that the transition between these portions is preferably smooth. Further, this portion includes no edges to avoid augmented bending loads in these portions.

The present saddle tube may be made of plastic material, in particular a fiber reinforced plastic material, and most preferred carbon, the manufacturing preferably employing corresponding mold.

Likewise, the saddle tube may be made of a metal material, preferably aluminum. Here, a common tube is used which has a smaller diameter in the saddle post portion than in the bottom bracket portion. For example, the diameter of the saddle tube in the saddle post portion is 35 mm and 42.5 mm in the bottom bracket portion. A conical transition portion is provided in between. Such a tube is preferably made by flaring a cylindrical tube with a constant outer diameter. This may be done by inserting or driving a corresponding die into the tube. Depending on the configuration, the die is either conical or has a conical portion corresponding to the transition portion and a cylindrical portion corresponding to the bottom bracket portion. Irrespective of the diameters selected, the bottom bracket portion of the saddle tube is given an oval shape in a next manufacturing step, e.g. by pressing. For example, the oval shape imparted has a large width of 50 mm and a small width of 35 mm. Subsequently, in the next manufacturing step, a flat portion is formed by pressing the corresponding surface. Pressing the flat portion is preferably effected such that the distance between the flat portion and a longitudinal axis of the saddle tube in the bottom bracket portion corresponds to the radius or half the diameter of the saddle tube in the saddle post portion. For an outer diameter at the saddle post end of 35 mm, this distance thus amounts to 17.5 mm.

It is an essential advantage of the present saddle tube, as studies have shown, that compared to a conventional saddle tube with a constant diameter of 35 mm, the bottom bracket stiffness can be increased by about 20% when a saddle tube according to the invention is used. This is true for identical weights, the wall thickness of the saddle tube even decreasing in the bottom bracket portion because of the increase of circumference.

Due to the flat portion provided according to the invention on the chain ring side, a material thickening is produced in this region when the saddle tube is made of metal material, such as aluminum. This is particularly advantageous for fastening the derailer. Therefore, a greater wall thickness is provided in the region of the flat portion also when manufacturing the present saddle tube from plastic material. With saddle tubes of plastic material, or especially carbon, the derailer may be fastened by gluing. In addition to or instead of gluing, the chain derailer may be attached by riveting. This is also preferred for metal saddle tubes.

Further, the invention is directed to a bicycle frame, in particular a racing bicycle frame, comprising a top tube and a down tube connected with the top tube through a fork receiving element. A saddle tube is provided between the top tube and the down tube, the saddle tube and the down tube possibly being connected by a bottom bracket receiving element. As described above, the saddle tube is configured or developed according to the present invention.

BRIEF DESCRIPTION OF THE DRAWINGS

The following is a detailed description of the invention with reference to a preferred embodiment and to the accompanying drawings.

In the Figures.

Figure 7:
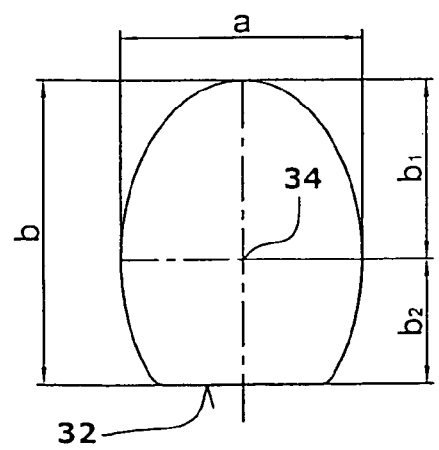
FIG. 7 is a schematic sectional view along line VII-VII in FIG. 2.

The bicycle frame has a top tube 10 connected to a down tube 14 through a fork receiving element 12. In the embodiment illustrated, the down tube 14 is connected with a saddle tube 18 through a bottom bracket receiving element 16. The saddle tube 18 has its saddle post end 20, i.e. the end of the saddle tube 18 into which a saddle post carrying a saddle can be inserted, connected with the top tube 10. In the embodiment illustrated, the saddle tube 18 is connected at the opposite end, the bottom bracket end 22, with the bottom bracket receiving element 16. The bottom bracket end 22 may also be connected with the down tube 14. Further, it is also possible to make a connection with the down tube 14 and the bottom bracket receiving element 16. According to the invention, at the bottom bracket end 22, the saddle tube 18 has a width b transverse to the longitudinal direction 24 of the frame that is larger than the width a in the longitudinal direction 24 of the frame (FIG. 7). In the embodiment shown, this is a partly transverse oval portion.

Figure 5:
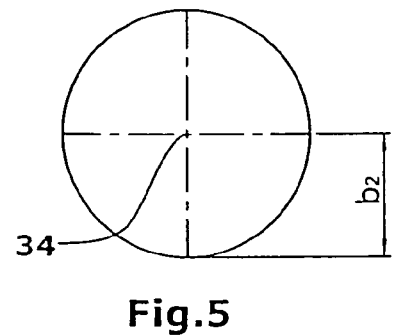
FIG. 5 is a schematic sectional view along line V-V in FIG. 2.
Figure 6:
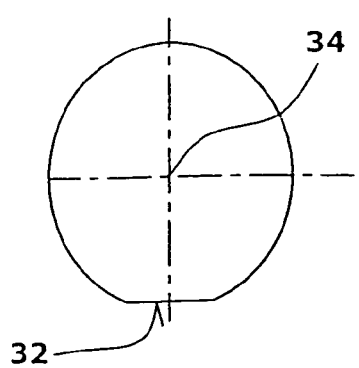
FIG. 6 is a schematic sectional view along Vi-Vi in FIG. 2.

At the saddle post end 20, the saddle tube 18 has a saddle post portion 26 and it has a bottom bracket portion 28 at its bottom bracket end 22. A transition portion 30 is provided between both portions 26, 28. The bottom bracket portion 28 has a constant cross section over its entire length, as illustrated in FIG. 7. The saddle post portion 26 also has a constant cross section over its entire length. The same is round as shown in FIG. 5. The transition portion 30 is substantially conical and tapers from the bottom bracket portion 28 towards the saddle post portion 26.

In the embodiment illustrated, the smaller width a in the bottom bracket portion 28 of the saddle tube 18 corresponds to the diameter of the saddle post portion 26.

According to a particularly preferred embodiment of the invention, the saddle tube 18 has a flat portion 32 at least in the bottom bracket portion 28 to provide sufficient space for the chain rings and the derailer levers. In the embodiment shown, the flat portion is 7.5 mm, relative to a full oval. This means that, with respect to the longitudinal side 34 of the saddle tube, a distance Bi (FIG. 7) is 25 mm and a distance $b_2$ is 17.5 mm, i.e. the radius of the saddle tube in the saddle post portion 26 (FIG. 5). Preferably, the flat portion is within the range of 5-9 mm. The flat portion preferably extends both over the bottom bracket portion 28 and the transition portion 30. Here, the flat portion preferably extends over more than half of the entire length of the saddle tube.

Figure 1:
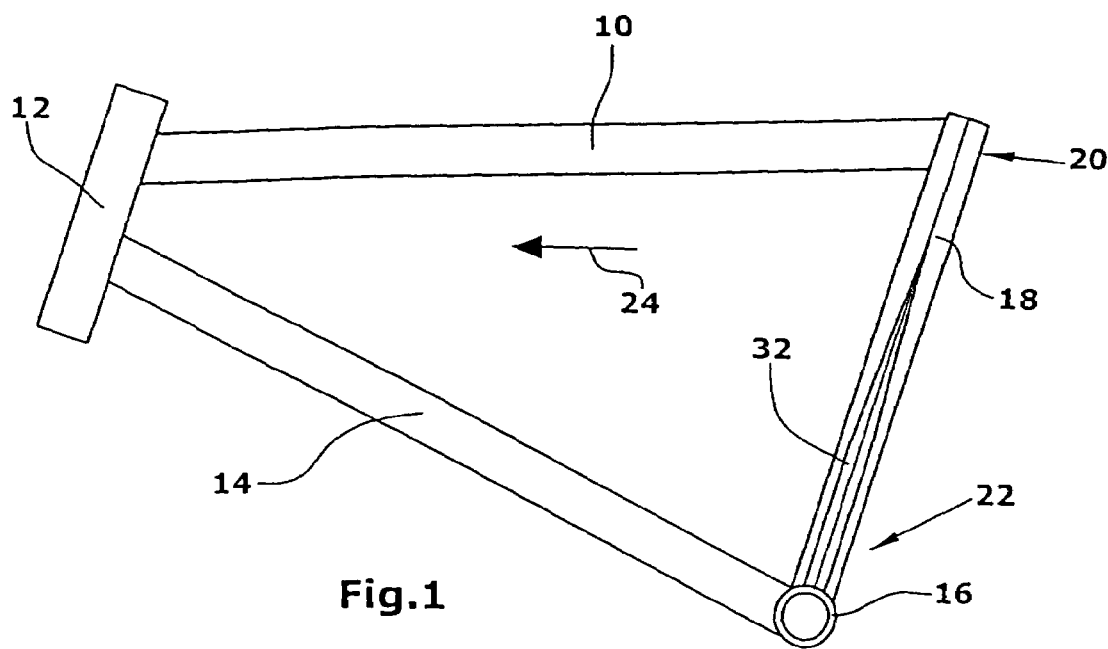
FIG. 1 is a schematic side view of a bicycle frame with a saddle tube according to the present invention.
Figure 2:
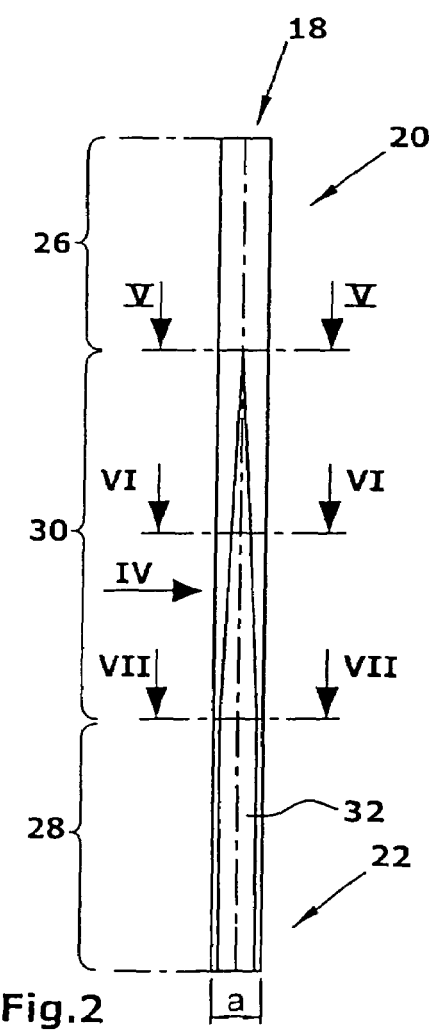
FIG. 2 is an enlarged schematic side view of the saddle tube corresponding to FIG. 1.
Figure 3:
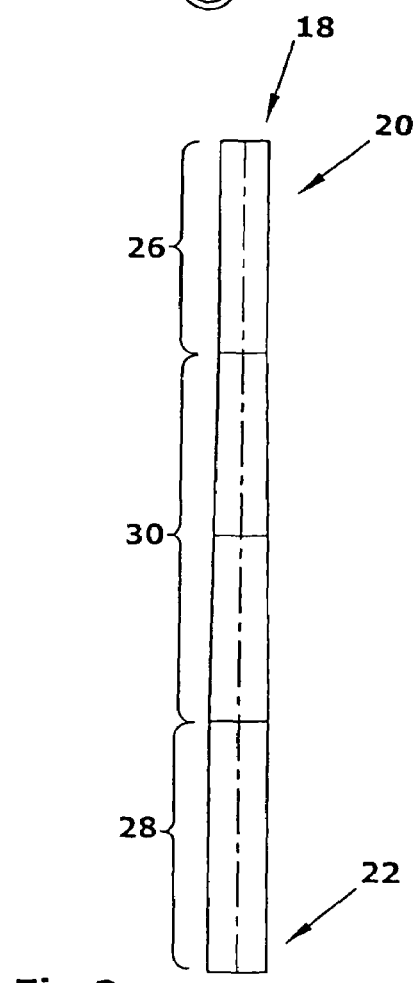
FIG. 3 is a schematic side view of the rear side of the saddle tube of FIG. 1.
Figure 4:
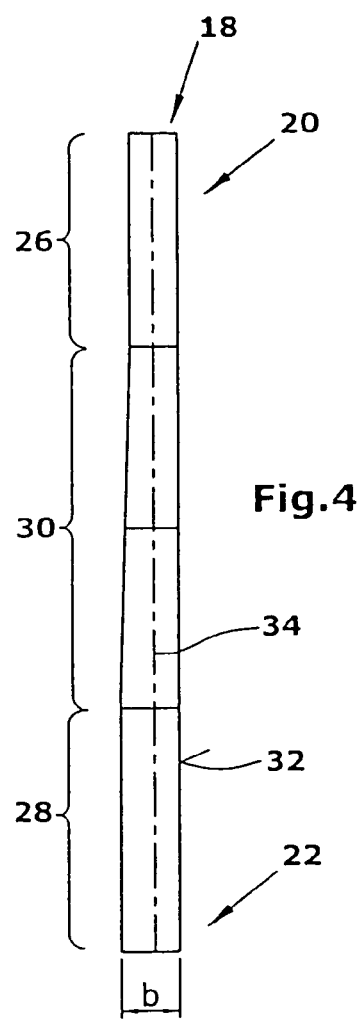
FIG. 4 is a schematic side view of the saddle tube seen in the direction of the arrow IV in FIG. 2.

Preferably, the flat portion also extends into the transition region 30, so that, the side view of FIG. 4, the flat portion smoothly passes into the saddle post portion 26. At the chain ring side, a surface line extending in the longitudinal direction of the saddle post portion 26 thus lies in the plane of the flat portion.

The invention claimed is:

1. A bicycle frame, comprising: a top tube (10); a down tube (14) connected with the top tube (10) through a fork receiving element (12); and a saddle tube (18) having a bottom bracket portion (28), at the end of which is a bottom bracket end (22), wherein the bottom bracket end (22) of the saddle tube (18) has a width (b) transverse to the longitudinal direction (24) of the frame that is larger than the width (a) in the longitudinal direction (24) of the frame, and wherein said bottom bracket portion (28) of the saddle tube (18), has a constant cross section over its entire length.

2. The saddle tube of claim 1, for a bicycle frame, especially a racing bicycle frame, wherein the bottom bracket end (22) of the saddle tube (18) being wider (b) in a direction transverse to the longitudinal direction (24) of the frame than in the longitudinal direction (24) of the frame, wherein the saddle tube (18) has a flat portion (32) on the side facing the chain ring.

3. The saddle tube of claim 2, wherein the bottom bracket end (22) is at least partly shaped as a transverse oval.

4. The saddle tube of claim 2, wherein the saddle tube (18) is shaped circularly cylindrical at its saddle post end (20).

5. The saddle tube of claim 2, wherein, in a bottom bracket portion (28), the cross section of the saddle tube (18) is constant in the longitudinal direction of the saddle tube.

6. The saddle tube of claim 2, wherein, a saddle post portion (26), the cross section of the saddle tube (18) is constant in the longitudinal direction of the saddle tube.

7. The saddle tube of claim 6, wherein, the saddle tube (18) has a substantially conical transition portion (30) between the bottom bracket portion (28) and the saddle post portion (26).

8. The saddle tube of claim 7, wherein the flat portion (32) extends into the transition portion (30).

9. The saddle tube of claim 8, wherein the flat portion (32) is configured such that it passes smoothly into the saddle post portion (26).

10. The saddle tube of claim 2, wherein the flat portion (32) extends from the bottom bracket portion (22) of the saddle tube to the saddle post position.

11. The saddle tube of claim 2, wherein the distance ($b_2$) between the longitudinal axis (34) of the saddle tube and the flat portion (32) at the bottom bracket end (22) corresponds to the radius of the saddle tube at the saddle post end.

12. A bicycle frame, especially a racing bicycle frame, comprising a top tube (10) and a down tube (14) connected with the top tube (10) through a fork receiving element (12), and a saddle tube according to claim 2 connected with the top tube (10) and the down tube (14).

13. A saddle tube for a bicycle frame, especially a racing bicycle frame, the bottom bracket end (22) of the saddle tube (18) being wider (b) in a direction transverse to the longitudinal direction (24) of the frame than in the longitudinal direction (24) of the frame, wherein the saddle tube (18) has a flat portion (32) on the side facing the chain ring, and said saddle tube includes a saddle post portion (26), wherein the saddle tube (18) has a substantially stepless transition portion (30) between the bottom bracket portion (28) and the saddle post portion (26).

14. A saddle tube for a bicycle frame, especially a racing bicycle frame, the bottom bracket end (22) of the saddle tube (18) being wider (b) in a direction transverse to the longitudinal direction (24) of the frame than in the longitudinal direction (24) of the frame, wherein the saddle tube (18) has a flat portion (32) on the side of the chain ring, wherein the distance ($b_2$) between the longitudinal axis (34) of the saddle tube and the flat portion (32) at the bottom bracket end (22) corresponds to the radius of the saddle tube at the saddle post end.

* * * * *